United States Patent
Thielen et al.

(10) Patent No.: US 7,091,274 B2
(45) Date of Patent: Aug. 15, 2006

(54) PNEUMATIC TIRE HAVING A RUBBER COMPONENT CONTAINING A TIN/AMINO FUNCTIONALIZED RUBBER AND AN INVERSION CARBON BLACK

(75) Inventors: Georges Marcel Victor Thielen, Luxembourg (LU); Kenneth Allen Bates, Brunswick, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 335 days.

(21) Appl. No.: 10/313,484

(22) Filed: Dec. 5, 2002

(65) Prior Publication Data

US 2003/0125448 A1    Jul. 3, 2003

Related U.S. Application Data

(60) Provisional application No. 60/339,874, filed on Dec. 6, 2001.

(51) Int. Cl.
*C08K 3/04* (2006.01)
*C08K 5/57* (2006.01)

(52) U.S. Cl. .......... 524/496; 152/450; 524/178; 524/262; 524/267; 524/393; 524/495; 525/332.9

(58) Field of Classification Search .......... 524/495, 524/496, 178, 484, 490, 491, 492, 784; 525/332.6, 525/332.8, 332.7, 333.1, 332.9, 366, 367
See application file for complete search history.

(56) References Cited

U.S. PATENT DOCUMENTS

| 5,527,860 A | * | 6/1996 | Yamakawa et al. ...... 525/332.9 |
| 6,056,933 A | * | 5/2000 | Vogler et al. ............ 423/449.1 |
| 6,090,880 A | | 7/2000 | Zimmer et al. ............ 524/492 |
| 6,099,818 A | | 8/2000 | Freund et al. ........... 423/449.1 |
| 6,191,234 B1 | * | 2/2001 | Tadaki et al. ............ 525/332.9 |
| 6,232,381 B1 | | 5/2001 | Hsu et al. ................... 524/394 |
| 6,251,983 B1 | | 6/2001 | Vogler et al. ............... 524/496 |
| 6,344,518 B1 | * | 2/2002 | Kobayashi et al. ......... 524/862 |

FOREIGN PATENT DOCUMENTS

EP    0 949 303 A1    10/1999
EP    1 000 970 A1    5/2000

OTHER PUBLICATIONS

European Search Report for EP 02 02 6834 for corresponding U.S. application.

* cited by examiner

Primary Examiner—Vasu Jagannathan
Assistant Examiner—Sandra K. Poulos
(74) Attorney, Agent, or Firm—John D. DeLong

(57) ABSTRACT

There is disclosed a pneumatic tire having a rubberized component comprising:
  (A) a copolymer rubber that contains amino groups bound to the rubber and at least 40 percent of the terminal ends of the copolymer are modified or coupled with a tin compound; and
  (B) 10 to 150 phr of an inversion carbon black.

15 Claims, No Drawings

PNEUMATIC TIRE HAVING A RUBBER COMPONENT CONTAINING A TIN/AMINO FUNCTIONALIZED RUBBER AND AN INVERSION CARBON BLACK

This application claims the benefit under 35 U.S.C. 119(e) of U.S. Provisional Application 60/339,874 filed Dec. 6, 2001.

BACKGROUND OF THE INVENTION

U.S. Pat. Nos. 6,251,983 and 6,056,933 disclose inversion carbon blacks and their manufacture, the contents of which are incorporated by reference in their entirety. These carbon blacks have a lower proportion of larger particles if the additions of combustion air and carbon black raw material are increased in an appropriate manner.

U.S. Pat. No. 6,191,234 disclose a conjugated diolefin-based copolymer rubber and its use in tires. The recommended reinforcement which is used when the copolymer rubber is used in a tire is carbon black or silica.

SUMMARY OF THE INVENTION

The present invention relates to a pneumatic tire having a rubber component containing a tin/amino functionalized rubber and an inversion carbon black.

DETAILED DESCRIPTION OF THE INVENTION

A pneumatic tire having a rubber component made from a rubber composition comprising:

(A) a copolymer rubber of a conjugated diolefin and an aromatic vinyl compound, wherein
  (1) the content of amino groups bound to the rubber (nitrogen content value) is 0.0025 to 0.20 mmol/g of copolymer rubber;
  (2) the content of the polymerization units of the aromatic vinyl compound is from 5 to 50 weight percent based on the copolymer rubber,
  (3) the content of vinyl bonds in the polymerization unit of the conjugated diolefin (the total content of a 1,2-bond and a 3,4-bond) is 90 mol percent based on the polymerization unit of the conjugated diolefin;
  (4) at least 40 percent of the polymerization end terminals of the copolymer rubber is modified or coupled with a tin compound; and
  (5) the molecular weight distribution is polymodol; and
(B) from 10 to 150 phr of an inversion carbon black having the properties a particle size distribution curve with an absolute slope of less than 400,000 nm³, the absolute slope AS being determined from measured aggregate size distribution using the following formula:

$$AS = \frac{\sum_{i=1}^{k} H_i(x_i - \overline{x})^3}{\sum_{i=1}^{k} H_i}$$

wherein $H_1$ denotes the frequency at which the particle diameter $x_1$ occurs and x is the particle diameter of the aggregate, whose weight corresponds to the average particle weight of the carbon black aggregate, the summation being carried out in the range of 1 to 3000 nm in equidistant spacing for each nanometer.

The content of the amino groups bound to the copolymer rubber is 0.0025 to 0.20 mmol/g of copolymer rubber. The content is preferably 0.0030 to 0.10 mmol/g of copolymer rubber, more preferably 0.0030 to 0.05 mmol/g of copolymer rubber.

The amino group may be bound to the polymerization start terminal or end terminal, or the main chain or side chain of a polymer. It is preferably introduced to the polymerization start terminal or end terminal so that hysteresis-loss characteristics can be improved by suppressing an energy loss from the terminal of a polymer.

The amino groups introduced to the chain of the polymer used in the present invention are represented by the following formulas I and II.

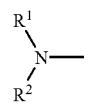

I wherein $R^3$ is hydrogen (—H), alkyl group having 1 to 20 carbon atoms or aryl group having 6 to 20 carbon atoms, and $R^2$ is an alkyl group having 1 to 20 carbon atoms or aryl group having 6 to 20 carbon atoms;

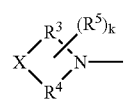

II wherein $R^3$ and $R^4$ are the same or different and each an alkylene group having 1 to 3 carbon atoms, X is a group selected from —CH$_2$—, —O— and —NH—, $R^5$ is hydrogen (—H) or alkyl group having 1 to 5 carbon atoms, and k is an integer of 1 to 4.

Illustrative examples of the structures represented by the above formulas I and II include dimethylamino group, diethylamino group, dipropylamino group, di-n-butylamino group, diisobutylamino group, dipentylamino group, dihexylamino group, di-n-butylamino group, diheptylamino group, dioctylamino group, diallylamino group, dicyclohexylamino group, butylisopropylamino group, dibenzylamino group, methylbenzylamino group, dibenzylamino group, methylhexylamino group, ethylhexylamino group, trimethyleneimino group, tetramethyleneimino group, 2-methyltetramethyleneimino group, 3-methyltetramethyleneimino group, pentamethyleneimono group, 2-methylpentamethyleneimino group, 3-methylpentamethyleneimino group, 4-methylpentamethyleneimino group, 3,5-dimethylpentamethyleneimino group, 2-ethylpentamethyleneimino group, hexamethyleneimono group, heptamethyleneimono group, dodecamethyleneimino group and the like.

When the introduction rate of these functional groups is less than 0.0025 mmol/g of a polymer, the hysteresis-loss characteristics, abrasion resistance and failure characteristics of the obtained copolymer rubber are not sufficiently improved, disadvantageously.

The method of introducing the functional group(s) of the formula I and/or the formula II into the terminal of the polymer of the present invention is not particularly limited, but the methods disclosed in U.S. Pat. No. 6,191,234 can be employed, for example. The first method comprises reacting an organic monolithium compound with a vinyl compound having the functional group(s) of the formula I and/or the formula II or with a conjugated diolefin compound and copolymerizing a conjugated diolefin with an aromatic vinyl compound.

Illustrative examples of the vinyl compound having the functional group(s) of the formula I and/or the formula II used in the first method include p-dimethylaminostyrene, p-diethylaminostyrene, p-dimethylaminomethylstyrene, p-(2-dimethylaminoethyl)styrene, m-(2-dimethylaminoethyl)styrene, p-(2-diethylaminoethyl)styrene, p-(2-dimethylaminovinyl)styrene, p-(2-diethylaminovinyl)styrene, 2-vinylpyridine, 4-vinylpyridine, 2-vinyl-5-ethylpyridine, 4-vinylbenzyldimethylaminoethylether and the like.

The second method comprises copolymerizing a conjugated diolefin with an aromatic vinyl compound in the presence of either the reaction product of the secondary amine compound(s) of the formula I and/or the formula II and an organic metal compound, or an alkali metal amide compound(s) of the formula I and/or the formula II as a polymerization initiator.

Illustrative examples of the secondary amine compound of the formula I used in the second method include dimethylamine, diethylamine, dipropylamine, di-n-butylamine, di-sec-butylamine, dipentylamine, dihexylamine, di-n-octylamine, di-(2-ethylhexyl)amine, dicyclohexylamine, N-methylbenzylamine, diallylamine and the like. Illustrative examples of the secondary amine compound of the formula II include morpholine, piperazine, 2,6-dimethylmorpholine, 2,6-dimethylpiperazine, 1-ethylpiperazine, 2-methylpiperazine, 1-benzylpiperazine, piperidine, 3,3-dimethylpiperidine, 2,6-dimethylpiperidine, 1-methyl-4-(methylamino)piperidine, 2,2,6,6-tetramethylpiperidine, pyrrolidine, 2,5-dimethylpyrrolidine, azetidine, hexamethyleneimine, heptamethyleneimine, 5-benzyloxyindole, 3-azaspiro[5,5]undecane, 3-azabicyclo[3.2.2]nonane, carbazole and the like.

The alkali metal amide compound(s) of the formula I and/or the formula II are a compound(s) obtained by substituting the hydrogen atom (H) of the secondary amine compounds of the formula I and/or the formula II with an alkali metal (Li, Na, K, Rb or Sc).

The third method comprises copolymerizing a conjugated diolefin with an aromatic vinyl compound in the presence of either the reaction product of the tertiary amine compound(s) of the formula I and/or the formula II and an organic alkali metal compound, or the alkali metal compound(s) of the formula I and/or the formula II as a polymerization initiator.

Illustrative examples of the vinyl compound having the functional group(s) of the formula I and/or the formula II used in the first method include p-dimethylaminostyrene, p-diethylaminostyrene, p-dimethylaminomethylstyrene, p-(2-dimethylaminoethyl)styrene, m-(2-dimethylaminoethyl)styrene, p-(2-diethylaminoethyl)styrene, p-(2-dimethylaminovinyl)styrene, p-(2-diethylaminovinyl)styrene, 2-vinylpyridine, 4-vinylpyridine, 2-vinyl-5-ethylpyridine, 4-vinylbenzyldimethylaminoethylether and the like.

The second method comprises copolymerizing a conjugated diolefin with an aromatic vinyl compound in the presence of either the reaction product of the secondary amine compound(s) of the formula I and/or the formula II and an organic metal compound, or an alkali metal amide compound(s) of the formula I and/or the formula II as a polymerization initiator.

Illustrative examples of the secondary amine compound of the formula I used in the second method include dimethylamine, diethylamine, dipropylamine, di-n-butylamine, di-sec-butylamine, dipentylamine, dihexylamine, di-n-octylamine, di-(2-ethylhexyl)amine, dicyclohexylamine, N-methylbenzylamine, diallylamine and the like. Illustrative examples of the secondary amine compound of the formula II include morpholine, piperazine, 2,6-dimethylmorpholine, 2,6-dimethylpiperazine, 1-ethylpiperazine, 2-methylpiperazine, 1-benzylpiperazine, piperidine, 3,3-dimethylpiperidine, 2,6-dimethylpiperidine, 1-methyl-4-(methylamino)piperidine, 2,2,6,6-tetramethylpiperidine, pyrrolidine, 2,5-dimethylpyrrolidine, azetidine, hexamethyleneimine, heptamethyleneimine, 5-benzyloxyindole, 3-azaspiro[5,5]undecane, 3-azabicyclo[3.2.2]nonane, carbazole and the like.

The alkali metal amide compound(s) of the formula I and/or the formula II are a compound(s) obtained by substituting the hydrogen atom (H) of the secondary amine compounds of the formula I and/or the formula II with an alkali metal (Li, Na, K, Rb or Sc).

The third method comprises copolymerizing a conjugated diolefin with an aromatic vinyl compound in the presence of either the reaction product of the tertiary amine compound(s) of the formula I and/or the formula II and an organic alkali metal compound, or the alkali metal compound(s) of the formula I and/or the formula II as a polymerization initiator.

Illustrative examples of the tertiary amine compound of the formula I used in the third method include N,N-dimethyl-o-toluidine, N,N-dimethyl-p-toluidine, N,N-dimethyl-m-toluidine, alpha-picoline, beta-picoline, gamma-picoline, benzyldimethylamine, benzyldiethylamine, benzyldipropylamine, benzyldibutylamine, (o-methylbenzyl)dimethylamine, (m-methylbenzyl)dimethylamine, (p-methylbenzyl)dimethylamine and the like.

Illustrative examples of the tertiary amine compound of the formula II include N,N-tetramethylene-o-toluidine, N,N-heptamethylene-o-toluidine, N,N-hexamethylene-o-toluidine, N,N-trimethylenebenzylamine, N,N-tetramethylenebenzylamine, N,N-hexamethylenebenzylamine, N,N-tetramethylene(o-methylbenzyl)amine, N,N-tetramethylene(p-methylbenzyl)amine, N,N-hexamethylene(o-methylbenzyl)amine, N,N-hexamethylene(o-methylbenzyl)amine and the like.

The organic metal compound(s) of the formula I and/or the formula II are a compound(s) obtained by substituting the active hydrogen atoms of the tertiary amine compounds of the formula I and/or the formula II with an alkali metal (Li, Na, K, Rb or Sc).

When the conjugated diolefin is copolymerized with the aromatic vinyl compound in the presence of, as a polymerization initiator, the reaction product of the secondary amine compound(s) or tertiary amine compound(s) of the formula I and/or the formula II and an organic alkali metal compound, the organic alkali metal compound to be reacted with the above secondary amine compound or tertiary amine compound is preferably an organic lithium compound. Specific examples of the organic lithium compound include ethyl lithium, propyl lithium, n-butyl lithium, sec-butyl lithium, tert-butyl lithium, hexyl lithium, and mixtures thereof. Of these, n-butyl lithium and sec-butyl lithium are preferred.

The molar ratio of the amino group (NH) in the structure of the secondary amine compound or the active hydrogen in the structure of the tertiary amine compound to the organic alkali metal compound must be 1:0.2 to 5.0, preferably 1:0.5 to 2.0, more preferably 1:0.8 to 1.2, to carry out the reaction between the secondary amine compound or the tertiary amine compound and the organic alkali metal compound. When the molar ratio of the organic alkali metal compound to the amino group (NH) in the structure of the secondary amine compound or to the active hydrogen in the structure of the tertiary amine compound is larger than 5.0, the effect of improving tensile strength, abrasion resistance and hysteresis-loss characteristics is not obtained. On the other hand, when the above molar ratio is smaller than 0.2, the polymerization rate remarkably lowers, thereby not only reducing productivity sharply but also lowering modification efficiency at the time of modifying the terminal of a polymer with a functional group.

The reaction between the secondary amine compound or the tertiary amine compound and the organic alkali metal compound may be carried out in a reaction pot separate from a polymerization vessel before polymerization, and the reaction product may be charged into the polymerization vessel.

The reaction between the secondary amine compound or the tertiary amine compound and the organic alkali metal compound basically proceeds instantaneously but an aging time of 1 to 180 minutes may be taken. Since the product of the reaction is relatively stable in a nitrogen atmosphere, it may be used immediately after the reaction or may be used after stored for 10 to 14 days. The reaction between the secondary amine compound or the tertiary amine compound and the organic alkali metal compound is desirably carried out a temperature range of zero to 120° C.

Polymerization may be carried out after the reaction between the secondary amine compound or the tertiary amine compound and the organic alkali metal compound is carried out in a polymerization vessel in the presence of both a monomer of a conjugated diolefin and a monomer of an aromatic vinyl compound. The reaction temperature at this point corresponds to the polymerization start temperature but may be arbitrarily selected from a temperature range of zero to 120° C.

The copolymer rubber of the present invention is a polymer obtained by copolymerizing a conjugated diolefin with an aromatic vinyl compound and characterized by having amino groups as described above.

Preferred examples of the conjugated diolefin compound used in the present invention include 1,3-butadiene, isoprene, 2,3-dimethyl-1,2-butadiene, 2-chloro-1,3-butadiene, 1,3-pentadiene, and mixtures thereof.

Preferred examples of the aromatic vinyl compound include styrene, 2-methylstyrene, 3-methylstyrene, 4-methylstyrene, .alpha.-methylstyrene, 2,4-dimethylstyrene, 2,4-diisopropylstyrene, 4-tert-butylstyrene, divinylbenzene, tert-butoxystyrene, and mixtures thereof. Of these, styrene is particularly preferred.

The content of the aromatic vinyl compound bound to the polymer chain, that is, the content of the polymerization units of the aromatic vinyl compound is from 5 weight percent to 50 weight percent. In accordance with one embodiment the content will range from 5 to 30 weight percent. In accordance with another embodiment, the content may range from 30 to 50 weight percent.

The content of the 1,2-bond and 3,4-bond (to be referred to as "vinyl bonds" hereinafter) in the polymerization unit of the conjugated diolefin may range from 10 to 90 mol percent or more. In accordance with one embodiment, the content may range from 25 to 55 mol percent. In accordance with another embodiment, the content will be from 35 to 75 mol percent.

The copolymer rubber used in the present invention is characterized in that its molecular weight distribution measured by GPC is polymodal.

When the molecular weight distribution is monomodal and narrow (for example, Mw/Mn is less than 2.0) and the copolymer rubber is compounded with a reinforcement or other compounding ingredients, viscosity increases and processability deteriorates. Deterioration in the processability of a compound increases working costs, causes a dispersion failure of a reinforcement and other compounding ingredients and reduces the physical properties of the compound. When the molecular weight of raw rubber is reduced to lower the viscosity of the compound, hysteresis-loss characteristics deteriorate, the viscosity of rubber increases with the result that handling properties degrade, and a cold flow grows with the result that storage stability lowers.

When the molecular weight distribution is monomodal and wide (for example, Mw/Mn is 2.0 or more), a low-molecular weight component increases, whereby hysteresis-loss characteristics and abrasion resistance deteriorate.

The method for making polymodal the molecular weight distribution measured by GPC of the copolymer rubber, and terminating with the tin groups, the present invention is not particularly limited, but there are various methods disclosed in U.S. Pat. No. 6,191,234, for example.

The first method comprises copolymerizing a conjugated diolefin with an aromatic vinyl compound and adding a specific coupling agent when the polymerization conversion reaches 90 to 100 percent to react the coupling agent with part of the active terminals of a polymer to jump the molecular weight. The amount of the coupling agent added is adjusted to control the amount of a polymer having an increased molecular weight and the amount of a polymer not reacted with the coupling agent so as to make the molecular weight distribution polymodal.

The specific tin coupling agent that is caused to be reacted with the active terminals of the polymer when the polymerization conversion reaches 90 to 100 percent is a tin compound.

Specific examples of the tin compound include tetrachlorotin, tetrabromotin, trichlorobutyltin, trichloromethyltin, trichlorooctyltin, dibromodimethyltin, dichlorodimethyltin, dichlorodibutyltin, dichlorodioctyltin, 1,2-bis(trichlorostannyl)ethane, 1,2-bis(methyldichlorostannylethane), 1,4-bis(trichlorostannyl)butane, 1,4-bis(methyldichlorostannyl)butane, ethyltin tristearate, butyltin trisoctanoate, butyltin trisstearate, butyltin trislaurate, dibutyltin bisoctanoate, dibutyltin bisstearate, dibutyltin bislaurate and the like.

The tin compound may be added in such an amount that ensures that the amount of a halogen atom or carboxylate group will be 0.05 to 5 equivalents based on the equivalent of 1 g of lithium atoms.

These compounds that are added and reacted when the polymerization conversion of the copolymer rubber reaches 90 to 100 percent may be used alone or in combination of two or more.

To enhance the reaction efficiency of the compounds with the active terminals of the polymer, it is preferred that a terminal modification reaction is carried out after a conjugated diene compound such as 1,3-butadiene is added to a polymerization system after the production of copolymer rubber in an amount of 0.5 to 500 moles, preferably 1 to 200 moles, based on the equivalent of 1 g of lithium atoms.

Extender oil or liquid rubber can be added to a polymer that is modified or coupled with these compounds when highly aromatic extender oil having a viscosity-gravity constant of at least 0.950 is used in conjunction with a tin compound, the tin-carbon bond is cleaved before compounding and the modification effect is lost. Therefore, extender oil having a viscosity-gravity constant of 0.800 to 0.950 or liquid rubber is preferred.

The polymerization reaction and modification or tin coupling reaction for obtaining the copolymer rubber used in the present invention are generally carried out at a temperature of zero to 120° C., under either a constant temperature condition or a temperature-rising condition. The polymerization system may be either batch or continuous.

An ether compound such as diethyl ether, di-n-butyl ether, ethylene glycol diethyl ether, ethylene glycol dibutyl ether, diethylene glycol dimethyl ether, propylene glycol dimethyl ether, propylene glycol diethyl ether, propylene glycol dibutyl ether, tetrahydrofuran, 2,2-(bistetrahydrofurfuryl)propane, bistetrahydrofurfurylformal, methyl ether of tetrahydrofurfuryl alcohol, ethyl ether of tetrahydrofurfuryl alcohol, butyl ether of tetrahydrofurfuryl alcohol, .alpha.-methoxytetrahydrofuran, dimethoxybenzene or dimethoxyethane, and/or a tertiary amine compound such as triethylamine, pyridine, N,N,N',N'-tetramethylethylene diamine, dipiperidinoethane, methyl ether of N,N-diethylethanolamine, ethyl ether of N,N-diethylethanolamine, or butyl ether of N,N-diethylethanolamine are/is added to a polymerization system as required to adjust the microstructure (content of vinyl bonds) of the conjugated diolefin portion of the diolefin-based (co)polymer.

Preferred examples of the hydrocarbon solvent used to polymerize the copolymer rubber of the present invention include pentane, hexane, heptane, octane, methylcyclopentane, cyclohexane, benzene, xylene and the like.

To improve the reactivity of an initiator used in the present invention, to arrange the aromatic vinyl compound to be introduced to the polymer at random or to provide the single chain of the aromatic vinyl compound, a potassium compound may be added together with the polymerization initiator. Illustrative examples of the potassium compound to be added together with the polymerization initiator include potassium alkoxides and potassium phenoxides such as potassium isopropoxide, potassium-t-butoxide, potassium-t-amyloxide, potassium-n-heptaoxide, potassium benzyloxide and potassium phenoxide; potassium salts of isovaleric acid, caprylic acid, lauric acid, palmitic acid, stearic acid, oleic acid, linolenic acid, benzoic acid, phthalic acid and 2-ethylhexoic acid; potassium salts of organic sulfonic acids such as dodecylbenzenesulfonic acid, tetradecylbenzenesulfonic acid, hexadecylbenzenesulfonic acid and octadecylbenzenesulfonic acid; potassium salts of organic phosphorous acids such as diethyl phosphite, duisopropyl phosphate, diphenyl phosphate, dibutyl phosphate and dilauryl phosphate; and the like.

The potassium compound may be added in an amount of 0.005 to 0.5 mole based on the equivalent of 1 g of lithium atoms of the organic lithium compound used in the formation of an initiator. When the amount is smaller than 0.005 mole, effects obtained by adding the potassium compound (the improvement of the reactivity of the initiator, the random arrangement of the aromatic vinyl compound and the provision of a single chain) are not obtained. On the other hand, when the amount is larger than 0.5 mole, the polymerization activity lowers, thereby not only reducing productivity greatly but also reducing modification efficiency when a reaction for modifying the terminal of the polymer with a functional group is carried out.

When the copolymer used in the present invention is polymerized using an alkali metal amide initiator, an alkali metal alkoxide compound may be added together with a polymerization initiator to improve polymerization reactivity as well as reaction efficiency between the active terminal of a polymer and the tin modifier (coupling agent). The alkali metal alkoxide compound may be produced through a reaction between an alcohol having a corresponding structure and an organic alkali metal compound, and this reaction may be carried out in the presence of the monomer before a conjugated diolefin and an aromatic vinyl compound are copolymerized in a hydrocarbon solvent.

Preferred examples of the alkali metal alkoxide compound include tetrahydrofurfuryl alcohol, N,N-dimethyl ethanolamine, N,N-diethyl ethanolamine, 1-piperazine ethanolamine and the like.

The organic alkali metal compound to be reacted with an alcohol compound to produce an alkali metal alkoxide is preferably an organic lithium compound. Specific examples of the organic lithium compound include ethyl lithium, propyl lithium, n-butyl lithium, sec-butyl lithium, t-butyl lithium, hexyl lithium, and mixtures thereof. Of these, n-butyl lithium and sec-butyl lithium are preferred.

The molar ratio of the alcohol compound to the organic lithium compound must be 1:0.7 to 5.0, preferably 1:0.8 to 2.0, more preferably 1:0.9 to 1.2. When the molar ratio of the organic lithium compound is larger than 5.0, the effect of improving tensile strength, abrasion resistance and hysteresis-loss characteristics cannot be obtained. On the other hand, when the molar ratio is smaller than 0.8, the polymerization speed remarkably lowers, thereby not only reducing productivity sharply but also reducing modification efficiency when a reaction for modifying the terminal of a polymer with a functional group is carried out.

In the present invention, when the conjugated diolefin compound such as 1,3-butadiene or isoprene is added in an amount of 1 to 100 times, preferably 1 to 50 times the number of moles of the initiator component to prepare an initiator which is the reaction product of the secondary amine compound or tertiary amine compound and the organic lithium compound, a polymerization reaction swiftly starts advantageously.

The Mooney viscosity (ML1+4, 100° C. of the copolymer rubber is preferably in the range of 20 to 200. When extender oil, such as aromatic process oil or naphthene-based process oil, or a liquid polymer having an average molecular weight of 150,000 or less is added to the polymer, the Mooney viscosity can be reduced to 100 or less and the polymer can be used without a problem in processability. However, when aromatic process oil having a viscosity-gravity constant of more than 0.950 is added to a polymer that is modified or tin coupled, the tin-carbon bond is easily broken. Therefore, the addition of extender oil having a viscosity-gravity constant (VGC) of at least 0.800 to 0.950 or liquid rubber is preferred.

The copolymer rubber to be used in the present invention can be isolated from a polymer reaction solution containing the copolymer rubber obtained in the present invention by a method which is used for general solution polymerization, for example, a method comprising adding to the solution a stabilizer and then extender oil such as aromatic process oil or naphthene-based process oil, or a liquid polymer (or a solution of the liquid polymer) having an average molecular weight of 150,000 or less as required, separating the solvent from rubber by a direct drying method or steam striping method, washing the rubber and drying it with a vacuum drier, hot air drier or roll.

The pneumatic tire of the present invention is comprised of a component containing the above described tin/amino functionalized copolymer rubber. The tin/amino functionalized copolymer rubber may range from 10 to 100 phr (parts by weight per 100 parts by weight of total rubber in the component). Preferably, from 50 to 100 phr of the rubber in the component is the tin/amino functionalized copolymer.

Commercially available tin/amino functionalized rubbers include T5560 and T5561 which are marketed and manufactured by JSR Corporation.

Any remaining rubber that is present in the tire component may be conventional rubbers or elastomers containing olefinic unsaturation.

The phrase "rubber or elastomer containing olefinic unsaturation" is intended to include both natural rubber and its various raw and reclaim forms as well as various synthetic rubbers. In the description of this invention, the terms "rubber" and "elastomer" may be used interchangeably, unless otherwise prescribed. The terms "rubber composition", "compounded rubber" and "rubber compound" are used interchangeably to refer to rubber which has been blended or mixed with various ingredients and materials and such terms are well known to those having skill in the rubber mixing or rubber compounding art. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1,4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include a carboxylated rubber, silicon-coupled and tin-coupled star-branched polymers. The preferred rubber or elastomers are polybutadiene and SBR.

In one aspect the rubber to be combined with the inversion carbon black is preferably of at least two of diene based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis 1,4-polybutadiene rubbers and emulsion polymerization prepared butadiene/acrylonitrile copolymers.

In one aspect of this invention, an emulsion polymerization derived styrene/butadiene (E-SBR) might be used having a relatively conventional styrene content of about 20 to about 28 percent bound styrene or, for some applications, an E-SBR having a medium to relatively high bound styrene content, namely, a bound styrene content of about 30 to about 45 percent.

When used in the tire tread, the relatively high styrene content of about 30 to about 45 for the E-SBR can be considered beneficial for a purpose of enhancing traction, or skid resistance. The presence of the E-SBR itself is considered beneficial for a purpose of enhancing processability of the uncured elastomer composition mixture, especially in comparison to a utilization of a solution polymerization prepared SBR (S-SBR).

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/acrylonitrile copolymer rubbers containing about 2 to about 40 weight percent bound acrylonitrile in the copolymer are also contemplated as diene based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

A purpose of using S-SBR is for improved tire rolling resistance as a result of lower hysteresis when it is used in a tire tread composition.

The 3,4-polyisoprene rubber (3,4-PI) is considered beneficial for a purpose of enhancing the tire's traction when it is used in a tire tread composition. The 3,4-PI and use thereof is more fully described in U.S. Pat. No. 5,087,668 which is incorporated herein by reference. The Tg refers to the glass transition temperature which can conveniently be determined by a differential scanning calorimeter at a heating rate of 10° C. per minute.

The cis 1,4-polybutadiene rubber (BR) is considered to be beneficial for a purpose of enhancing the tire tread's wear, or treadwear. Such BR can be prepared, for example, by organic solution polymerization of 1,3-butadiene. The BR may be conveniently characterized, for example, by having at least a 90 percent cis 1,4-content.

The pneumatic tire of the present invention contains an inversion carbon black. The inversion carbon blacks are furnace carbon blacks having CTAB values of 20 to 190 $m^2/g$ and 24M4-DBP absorptions of 40 to 140 mL/100 g, with a ratio tan $delta_0$/tan $delta_{60}$ which, during incorporation in an SSBR/BR rubber compound, satisfies the relation $$\text{Tan } delta_0/\text{tan } delta_{60} > 2.76 - 6.7 \times 10^{-3} \times CTAB,$$

where the value of tan $delta_{60}$ is always lower than the value for ASTM carbon blacks with the same CTAB surface area and 24M4-DBP absorption. This carbon black is characterized in that the distribution curve of the particle diameter sizes of the carbon black aggregate has an absolute skewness of less than 400,000 $nm^3$.

Compared to the known inversion carbon blacks, the carbon blacks used in the present invention are characterized by a narrower particle size distribution. For the description of the particle size distribution, the measure of "absolute skewness" used in statistics is used here (see: *Lothar Sachs: Statistical Evaluation Methods*, (in German) Springer-Verlag, Berlin, 3rd edition, Pages 81 through 83). It represents a description which is appropriate for the present problem, describing the shape of the particle size distribution curve as a range of particle sizes limited by maximum and minimum values.

The "absolute skewness" is defined as the deviation from a symmetrical particle size distribution. A slanted distribution curve exists when one of the two descending branches of the distribution curve is elongated. If the left curve portion is elongated, this is referred to as a negative skewness, that is, the determination of the absolute skewness determines values of less than zero. If the right curve section is elongated, the slope is positive, with values larger than zero. The known ASTM carbon blacks, as well as the inversion carbon blacks, and the carbon blacks according to the invention, present varying degrees of positive skewness.

The absolute skewness of the particle size distribution is smaller than 400,000, preferably smaller than 200,000, nm$^3$.

The absolute skewness of the particle size distribution of carbon black can be determined by means of a disk centrifuge and a corresponding evaluation of the measured values. The carbon black sample to be examined is in this process dispersed in an aqueous solution and separated in a disk centrifuge according to particle size; the larger the particles are, the greater is their weight, and thus the carbon black particles move more rapidly as a result of centrifugal force in the aqueous solution towards the outside. In this process, they pass through a light barrier, by means of which the extinction is recorded as a function of time. From these data, the particle size distribution, that is the frequency as a function of particle diameter, is calculated. Then the absolute skewness AS can be determined as follows:

$$AS = \frac{\sum_{i=1}^{k} H_i (x_i - \bar{x})^3}{\sum_{i=1}^{k} H_i}$$

In the formula, $H_1$ denotes the frequency at which the particle diameter $x_1$ occurs and is the particle diameter of the particles whose weight corresponds to the average particle weight of the carbon black aggregate. Also, is calculated using the particle size distribution. The summations of the above formula must be carried out in the range from 1 nm to 3000 nm in equidistant spacing for each nanometer. Any missing measurement values are estimated by linear interpolation.

The inversion carbon blacks for use in according the present invention can be manufactured according to the generic method described in DE 195 21 565 and U.S. Pat. No. 6,251,983, both of which are incorporated by reference in their entirety.

The amount of inversion carbon black used in the rubber compound for use in the tire component may vary. Generally, the level of inversion carbon black will range from 10 to 150 phr. Preferably, the level will range from 40 to 80 phr.

In addition to the inversion carbon black and elastomers in the rubberized component of the tire, conventional fillers may be also present. The amount of such conventional fillers may range from 10 to 250 phr. Preferably, the filler is present in an amount ranging from 20 to 100 phr.

The commonly employed siliceous pigments which may be used in the rubber compound include conventional pyrogenic and precipitated siliceous pigments (silica), although precipitated silicas are preferred. The conventional siliceous pigments preferably employed in this invention are precipitated silicas such as, for example, those obtained by the acidification of a soluble silicate, e.g., sodium silicate.

Such conventional silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, Page 304 (1930).

The conventional silica may also be typically characterized by having a dibutylphthalate (DBP) absorption value in a range of about 100 to about 400, and more usually about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, etc; silicas available from Rhodia, with, for example, designations of Z1165MP and Z165GR and silicas available from Degussa AG with, for example, designations VN2 and VN3, etc.

Commonly employed carbon blacks can be used as a conventional filler. Representative examples of such carbon blacks include N110, N121, N220, N231, N234, N242, N293, N299, S315, N326, N330, M332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP No. ranging from 34 to 150 cm$^3$/100 g.

It may be preferred to have the rubber composition for use in the tire component to additionally contain a conventional sulfur containing organosilicon compound. Examples of suitable sulfur containing organosilicon compounds are of the formula:

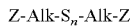

in which Z is selected from the group consisting of

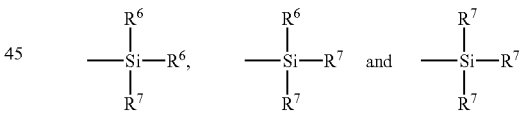

where $R^6$ is an alkyl group of 1 to 4 carbon atoms, cyclohexyl or phenyl; $R^7$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

Specific examples of sulfur containing organosilicon compounds which may be used in accordance with the present invention include: 3,3'-bis(trimethoxysilylpropyl) disulfide, 3,3'-bis (triethoxysilylpropyl)disulfide, 3,3'-bis (triethoxysilylpropyl)tetrasulfide, 3,3'-bis(triethoxysilylpropyl)octasulfide, 3,3'-bis(trimethoxysilylpropyl)tetrasulfide, 2,2'-bis(triethoxysilylethyl)tetrasulfide, 3,3'-bis(trimethoxysilylpropyl)trisulfide, 3,3'-bis(triethoxysilylpropyl)trisulfide, 3,3'-bis(tributoxysilylpropyl)disulfide, 3,3'-bis(trimethoxysilylpropyl)hexasulfide, 3,3'-bis(trimethoxy silylpropyl)octasulfide, 3,3'-bis(trioctoxysilylpropyl)tetrasulfide, 3,3'-bis(trihexoxysilylpropyl)disulfide, 3,3'-bis(tri-2''- ethylhexoxysilylpropyl)trisulfide, 3,3'-bis(triisooctoxysilyl propyl)tetrasulfide, 3,3'-bis(tri-t-butoxysilylpropyl)disulfide, 2,2'-bis(methoxy diethoxy silyl ethyl)tetrasulfide, 2,2'-bis(tripropoxysilylethyl)pentasulfide, 3,3'-bis(tricyclonexoxysilylpropyl)tetrasulfide, 3,3'-bis(tricyclopentoxy silylpropyl)trisulfide, 2,2'-bis(tri-2"-methylcyclohexoxysilylethyl)tetrasulfide, bis(trimethoxysilylmethyl)tetrasulfide, 3-methoxy ethoxy propoxysilyl 3'-diethoxybutoxy-silylpropyltetrasulfide, 2,2'-bis(dimethyl methoxysilylethyl)disulfide, 2,2'-bis(dimethyl sec.butoxysilylethyl)trisulfide, 3,3'-bis(methyl butylethoxysilylpropyl)tetrasulfide, 3,3'-bis(di t-butylmethoxysilylpropyl)tetrasulfide, 2,2'-bis(phenyl methyl methoxysilylethyl)trisulfide, 3,3'-bis(diphenyl isopropoxysilylpropyl)tetrasulfide, 3,3'-bis(diphenyl cyclohexoxysilylpropyl)disulfide, 3,3'-bis(dimethyl ethylmercaptosilylpropyl)tetrasulfide, 2,2'-bis(methyl dimethoxysilylethyl) trisulfide, 2,2'-bis(methyl ethoxypropoxysilylethyl) tetrasulfide, 3,3'-bis(diethyl methoxysilylpropyl)tetrasulfide, 3,3'-bis(ethyl di-sec.butoxysilylpropyl)disulfide, 3,3'-bis (propyl diethoxysilylpropyl)disulfide, 3,3'-bis(butyl dimethoxysilylpropyl)trisulfide, 3,3'-bis(phenyl dimethoxysilylpropyl)tetrasulfide, 3-phenyl ethoxybutoxysilyl 3'-trimethoxysilylpropyl tetrasulfide, 4,4'-bis(trimethoxysilylbutyl)tetrasulfide, 6,6'-bis(triethoxysilylhexyl)tetrasulfide, 12,12'-bis(triisopropoxysilyl dodecyl)disulfide, 18,18'-bis (trimethoxysilyloctadecyl)tetrasulfide, 18,18'-bis(tripropoxysilyloctadecenyl)tetrasulfide, 4,4'-bis(trimethoxysilylbuten-2-yl)tetrasulfide, 4,4'-bis (trimethoxysilylcyclohexylene)tetrasulfide, 5,5'-bis (dimethoxymethylsilylpentyl)trisulfide, 3,3'-bis (trimethoxysilyl-2-methylpropyl)tetrasulfide, 3,3'-bis (dimethoxyphenylsilyl-2-methylpropyl)disulfide.

The preferred sulfur containing organosilicon compounds are the 3,3'-bis(trimethoxy or triethoxy silylpropyl)sulfides. The most preferred compounds are 3,3'-bis(triethoxysilylpropyl)disulfide and 3,3'-bis(triethoxysilylpropyl)tetrasulfide. Therefore as to formula I, preferably Z is

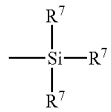

where $R^7$ is an alkoxy of 2 to 4 carbon atoms, with 2 carbon atoms being particularly preferred; alk is a divalent hydrocarbon of 2 to 4 carbon atoms with 3 carbon atoms being particularly preferred; and n is an integer of from 2 to 5 with 2 and 4 being particularly preferred.

The amount of the sulfur containing organosilicon compound of formula III in a rubber composition will vary depending on the level of other additives that are used. Generally speaking, the amount of the compound of formula III will range from 0.5 to 20 phr. Preferably, the amount will range from 1 to 10 phr.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. Preferably, the sulfur vulcanizing agent is elemental sulfur. The sulfur vulcanizing agent may be used in an amount ranging from 0.5 to 8 phr, with a range of from 1.5 to 6 phr being preferred. Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, naphthenic, and/or paraffinic processing oils. Typical amounts of antioxidants comprise about 1 to about 5 phr. Representative antioxidants may be, for example, diphenyl-p-phenylenediamine and others, such as, for example, those disclosed in the *Vanderbilt Rubber Handbook* (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, preferably about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The mixing of the rubber composition can be accomplished by methods known to those having skill in the rubber mixing art. For example the ingredients are typically mixed in at least two stages, namely at least one non-productive stage followed by a productive mix stage. The final curatives including sulfur vulcanizing agents are typically mixed in the final stage which is conventionally called the "productive" mix stage in which the mixing typically occurs at a temperature, or ultimate temperature, lower than the mix temperature(s) than the preceding non-productive mix stage (s). The rubber and inversion carbon black are mixed in one or more non-productive mix stages. The terms "non-productive" and "productive" mix stages are well known to those having skill in the rubber mixing art. The inversion carbon black may be added as a separate ingredient or in the form of a masterbatch. The rubber composition containing the inversion carbon black and tin-amino functionalized rubber, as well as the sulfur-containing organosilicon compound, if used, may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions and the volume and nature of the components. For example, the thermomechanical working may be from 1 to 20 minutes.

One may also incorporate the inversion carbon blacks into the elastomers via a number of ways aside from mechanical working in a mixer or extruder. For example, it is contemplated that one can disperse or dissolve the inversion carbon blacks in a polymer cement (elastomer solubilized in an organic solvent) with mixing and removal of the solvent to yield a uniformly dispersed inversion carbon black in the elastomer. In accordance with another embodiment, one can suspend the inversion carbon blacks in the organic solvent along with the monomer or monomers for subsequent solution polymerization. Under this embodiment, the monomers polymerize to form the elastomer in the presence of inversion carbon blacks.

The rubber composition containing the tin/amino functionalized rubber and inversion carbon black may be incorporated in a variety of rubber components of the tire. For example, the rubber component may be a tread (including tread cap and tread base), sidewall, apex, chafer, sidewall insert, wirecoat or innerliner. Preferably, the compound is a tread.

The pneumatic tire of the present invention may be a race tire, passenger tire, aircraft tire, agricultural, earthmover, off-the-road, truck tire and the like. Preferably, the tire is a passenger or truck tire. The tire may also be a radial or bias, with a radial being preferred.

Vulcanization of the pneumatic tire of the present invention is generally carried out at conventional temperatures ranging from about 100° C. to 200° C. Preferably, the vulcanization is conducted at temperatures ranging from about 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic tire having a rubber component made from a rubber composition comprising:
   (A) a copolymer rubber of a conjugated diolefin and an aromatic vinyl compound, wherein
      (1) the content of amino groups bound to the rubber (nitrogen content value) is 0.0025 to 0.20 mmol/g of copolymer rubber;
      (2) the content of the polymerization units of the aromatic vinyl compound is from 5 to 50 weight percent based on the copolymer rubber,
      (3) the content of vinyl bonds in the polymerization unit of the conjugated diolefin (the total content of a 1,2-bond and a 3,4-bond) is from 10 to 90 mol percent or more based on the polymerization unit of the conjugated diolefin;
      (4) at least 40 percent of the polymerization end terminals of the copolymer rubber is modified or coupled with a tin compound; and
      (5) the molecular weight distribution is polymodol; and
   (B) from 40 to 80 phr of an inversion carbon black having the properties a particle size distribution curve with an absolute slope of less than 400,000 nm$^3$, the absolute slope AS being determined from measured aggregate size distribution using the following formula:

$$AS = \frac{\sum_{i=1}^{k} H_i (x_i - \bar{x})^3}{\sum_{i=1}^{k} H_i}$$

wherein $H_i$ denotes the frequency at which the particle diameter $X_i$ occurs and x is the particle diameter of the aggregate, whose weight corresponds to the average particle weight of the carbon black aggregate, the summation being carried out in the range of 1 to 3000 nm in equidistant spacing for each nanometer.

2. The pneumatic tire of claim 1 wherein said copolymer rubber has a content of the polymerization units of the aromatic vinyl compound ranging from 5 weight percent to 30 weight percent based on the copolymer rubber and the content of vinyl bonds in the polymerization unit of the conjugated diolefin (the total content of a 1,2-bond and a 3,4-bond) is from 35 to 75 mol percent on the polymerization unit of the conjugated diolefin.

3. The pneumatic tire of claim 1 wherein said copolymer rubber has a
   (A) content of the polymerization units of the aromatic vinyl compound ranging from 30 to 50 weight percent based on the copolymer rubber; and
   (B) content of vinyl bonds in the polymerization unit of the conjugated diolefin (the total content of a 1,2-bond and a 3,4-bond) ranging from 25 to 55 mol percent based on the polymerization unit of the conjugated diolefin.

4. The pneumatic tire of claim 1 wherein said amino groups is represented by the following formula I and/or the following formula II:

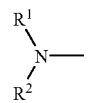

I wherein $R^1$ is hydrogen (—H), alkyl group having 1 to 20 carbon atoms or aryl group having 6 to 20 carbon atoms, and $R^2$ is an alkyl group having 1 to 20 carbon atoms or aryl group having 6 to 20 carbon atoms;

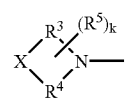

II wherein $R^3$ and $R^4$ are the same or different and each an alkylene group having 1 to 3 carbon atoms, X is a group selected from the group consisting of —$CH_2$—, —O— and —NH—, $R^5$ is hydrogen (—H) or alkyl group having 1 to 5 carbon atoms, and k is an integer of 1 to 4.

5. The pneumatic tire of claim 1 wherein said inversion carbon black, when incorporated in an SSBR/BR rubber compound, the carbon black results in the rubber compound satisfying the relation tan delta$_0$/tan delta$_{60}$>2.76 to 6.7× 10$^{-3}$×CTAB, and results in the rubber compound having a tan delta$_{60}$ value which is lower than that of a rubber compound incorporating an equivalent amount of a conventional ASTM carbon black having the same CTAB surface area and 24M4-DBP absorption value.

6. The pneumatic tire of claim 1 wherein the particle size distribution curve of the carbon black has an absolute slope of less than 200,000 nm$^3$.

7. The pneumatic tire of claim 1 wherein said inversion carbon black has a CTAB value from 20 to 190 m$^2$/g and 24M4-DPB absorption value from 40 to 140 mL/100 g.

8. The pneumatic tire of claim 7 wherein the CTAB surface area of the inversion carbon black is from 60 to 140 m$^2$/g.

9. The pneumatic tire of claim 1 wherein said rubber additionally contains a rubber selected from the group consisting of natural rubber, neoprene, polyisoprene, butyl rubber, halobutyl rubber, polybutadiene, styrene-butadiene copolymer, styrene/isoprene/butadiene rubber, methyl methacrylate-butadiene copolymer, isoprene-styrene copolymer, methyl methacrylate-isoprene copolymer, acrylonitrile-isoprene copolymer, acrylonitrile-butadiene copolymer, carboxylated rubber, EPDM, silicon-coupled star-branched polymers, tin-coupled star-branched polymers and mixtures thereof.

10. The pneumatic tire of claim 1 wherein from 0.5 to 20 phr of a sulfur containing organosilicon compound is present and is of the formula:

Z-Alk-S$_n$-Alk-Z  III in which Z is selected from the group consisting of

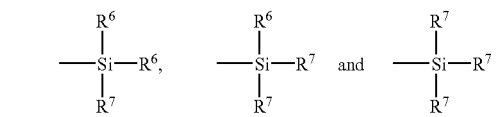

where R$^6$ is an alkyl group of 1 to 4 carbon atoms, cyclohexyl or phenyl; R$^7$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

11. The pneumatic tire of claim 1 wherein said composition is thermomechanically mixed at a rubber temperature in a range of from 140° C. to 190° C. for a total mixing time of from 1 to 20 minutes.

12. The pneumatic tire of claim 1 wherein said tire is selected from the group consisting of race tires, passenger tires, aircraft tires, agricultural, earthmover, off-the-road and truck tires.

13. The pneumatic tire of claim 1 where said tire is a radial.

14. A pneumatic tire of claim 1 wherein said rubber component is selected from the group consisting of tread, sidewall, apex, chafer, sidewall insert, wirecoat and innerliner.

15. The pneumatic tire of claim 14 wherein said component is a tread.

* * * * *